(12) United States Patent
DePottey et al.

(10) Patent No.: US 7,017,945 B2
(45) Date of Patent: Mar. 28, 2006

(54) ACTIVE VENTING APPARATUS AND METHOD FOR AIRBAG SYSTEMS

(76) Inventors: Timothy DePottey, 6213 E. Pierson Rd., Flint, MI (US) 48506; Melissa Ziolo, 4366 Kimberly La., Waterford, MI (US) 48329; David Schneider, 4091 Highview Ct., Waterford, MI (US) 48321; Charles Sherwin, 181 W. Snover, Mayville, MI (US) 48744; David J. Green, 632 W. 300 North, Brigham City, UT (US) 84302

( * ) Notice: Subject to any disclaimer, the term of this patent is extended or adjusted under 35 U.S.C. 154(b) by 280 days.

(21) Appl. No.: 10/150,873

(22) Filed: May 17, 2002

(65) Prior Publication Data

US 2003/0214124 A1    Nov. 20, 2003

(51) Int. Cl.
*B60R 21/28* (2006.01)
(52) U.S. Cl. .................................. 280/739; 411/20
(58) Field of Classification Search ........... 280/739, 280/742; 411/19, 20, 383, 384
See application file for complete search history.

(56) References Cited

U.S. PATENT DOCUMENTS

| | | | | |
|---|---|---|---|---|
| 3,159,075 A | * | 12/1964 | Bjork | 411/65 |
| 3,386,138 A | | 6/1968 | Overman | 24/211 |
| 3,567,245 A | * | 3/1971 | Ekstrom | 280/737 |
| 3,861,712 A | * | 1/1975 | Matsui et al. | 280/735 |
| 3,884,499 A | * | 5/1975 | Oka et al. | 280/735 |
| 4,810,148 A | * | 3/1989 | Aisa et al. | 411/383 |
| 5,009,374 A | | 4/1991 | Manfredi et al. | 244/1 R |
| 5,310,215 A | * | 5/1994 | Wallner | 280/739 |
| 5,366,242 A | | 11/1994 | Faigle et al. | 280/736 |
| 5,402,728 A | * | 4/1995 | Garner | 102/326 |
| 5,590,900 A | * | 1/1997 | Duran et al. | 280/728.2 |
| 5,695,214 A | * | 12/1997 | Faigle et al. | 280/735 |
| 5,709,405 A | | 1/1998 | Saderholm et al. | 280/736 |
| 5,743,558 A | | 4/1998 | Seymour | 280/739 |
| 5,853,192 A | | 12/1998 | Sikorski et al. | 280/739 |
| 5,918,901 A | | 7/1999 | Johnson et al. | 280/739 |
| 5,997,033 A | | 12/1999 | Gray et al. | 280/735 |
| 5,997,230 A | | 12/1999 | Dodd et al. | 411/383 |
| 6,017,056 A | | 1/2000 | Lee | 280/739 |

(Continued)

FOREIGN PATENT DOCUMENTS

DE    101 55 858 A1    6/2002

(Continued)

OTHER PUBLICATIONS

Theodore Baumeister; Standard Handbook for Mechanical Engineers; Sep. 18, 1974; Seventh Edition, pp. 8-30.*

*Primary Examiner*—Eric Culbreth
(74) *Attorney, Agent, or Firm*—Sally J Brown

(57) ABSTRACT

Enhanced airbag modules and associated methods are provided. An airbag module according to the invention may have a cushion with an inflatable protection zone and a flexible venting tube coupled to the inflatable protection zone. A closure mechanism may be used to compress the flexible venting tube against an anchoring member, such as a housing of the airbag module or a vehicle feature, until venting through the flexible venting tube is needed. The closure mechanism may then be actuated, for example, by igniting a pyrotechnic within a specially designed bolt of the closure mechanism. The bolt may, for example, have a bore with a pyrotechnic initiator molded-in-place within the bore. The bolt may fracture to open the closure mechanism, thereby permitting inflation gas to flow out of the inflatable protection zone via the flexible venting tube.

32 Claims, 7 Drawing Sheets

U.S. PATENT DOCUMENTS

| | | | |
|---|---|---|---|
| 6,126,196 A * | 10/2000 | Zimmerman | 280/739 |
| 6,139,048 A | 10/2000 | Braunschädel | |
| 6,158,770 A | 12/2000 | Ryan et al. | 280/736 |
| 6,161,866 A | 12/2000 | Ryan et al. | 280/736 |
| 6,179,537 B1 * | 1/2001 | Anders | 411/392 |
| 6,213,502 B1 | 4/2001 | Ryan et al. | 280/736 |
| 6,241,279 B1 | 6/2001 | Ochiai | 280/735 |
| 6,279,949 B1 * | 8/2001 | Braunschadel | 280/739 |
| 6,305,711 B1 | 10/2001 | Steffens, Jr. et al. | 280/777 |
| 6,357,953 B1 * | 3/2002 | Ballantyne | 403/43 |
| 6,364,356 B1 * | 4/2002 | Keshavaraj | 280/743.1 |
| 6,471,239 B1 * | 10/2002 | Nishijima et al. | 280/729 |
| 6,648,371 B1 * | 11/2003 | Vendely et al. | 280/739 |
| 6,783,151 B1 * | 8/2004 | Rasch et al. | 280/729 |
| 6,863,304 B1 * | 3/2005 | Reiter et al. | 280/739 |
| 2003/0020268 A1 | 1/2003 | Reiter et al. | |

FOREIGN PATENT DOCUMENTS

| | | |
|---|---|---|
| WO | WO-2003/006276 A3 | 1/2003 |

* cited by examiner

ACTIVE VENTING APPARATUS AND METHOD FOR AIRBAG SYSTEMS

BACKGROUND OF THE INVENTION

1. Field of the Invention

The present invention relates to systems and methods for protecting vehicle occupants from injury. More specifically, the present invention relates to devices that intelligently control gas venting from an inflatable cushion to enhance the protection provided by the cushion.

2. Description of Related Art

The inclusion of inflatable safety restraint devices, or airbags, is now a legal requirement for many new vehicles. Airbags are typically installed in the steering wheel and in the dashboard on the passenger side of a car. Additionally, airbags may be installed to inflate beside the passenger to provide side impact protection, in front of the knees to protect the knees from impact, over a passenger's head, or at other strategic locations.

In the event of an accident, an accelerometer within the vehicle measures the abnormal deceleration and triggers the ignition of a pyrotechnic charge. Expanding gases from the charge fill the airbags, which immediately inflate to protect the driver and/or passengers from impact against the interior surfaces of the vehicle. During normal vehicle operation, airbags are typically stowed behind covers to protect them from tampering and provide a more attractive interior facade for the vehicle.

Some airbag cushions have vents that are designed to permit inflation gas to escape from the cushion at a measured rate, thereby providing a softer cushion. Softer cushions are beneficial in low velocity collisions, in which the cushion need not be extremely stiff to prevent the occupant from contacting the vehicle interior. However, for high speed collisions, a stiffer cushion is needed to more rapidly absorb the occupant's velocity; hence, comparatively less venting is desirable. Other factors, such as the occupant's weight and position influence the optimal stiffness of the cushion.

Since all of the above factors can be expected to vary for any single vehicle, it would be desirable to create a system capable of varying the cushion stiffness in response to changes in vehicle velocity, occupant weight, occupant position, and the like. The desirability of such a system is reflected in the United States government's new frontal safety requirements, as set forth in the FMVSS 208 Ruling.

In response to such a need, some airbag systems have been designed with variable venting systems. Such variable venting systems typically have one or more vents formed in the rigid module housing; the vents are covered or uncovered through the use of some type of actuation mechanism. Thus, the amount of venting that occurs through the rigid module housing can be controlled to influence the stiffness of the cushion.

Unfortunately, known variable venting systems are limited in many respects. For example, many such systems utilize an actuation mechanism that is too slow to reliably permit the desired degree of venting to occur prior to impact of the occupant against the cushion. Some variable venting systems are simply too slow to vary the cushion stiffness based upon the impact velocity, and are thus unable to adapt the stiffness of the cushion to suit the severity of the collision.

Additionally, placement of vents on the rigid module housing imposes limitations on the size, shape, and location of the vents. Thus, the optimal degree of venting may be unobtainable. More precisely, the vents may not be large enough to release enough gas to soften the cushion as much as may be desirable. The vents may also be obstructed by internal components of the vehicle, thereby further reducing the degree of cushion adaptation that can be achieved.

Furthermore, many known variable venting systems are somewhat complex and expensive to produce. Often, several custom-manufactured parts are required. The design of the airbag module may be unduly hindered by placement of the vents on the rigid module housing; such placement may interfere with the positioning of other module components such as the inflator, mounting hardware, and the like.

Accordingly, a need exists for an airbag module and associated manufacturing and activation methods by which the stiffness of the cushion can be rapidly adapted. Preferably, such adaptation occurs rapidly enough to take effect after the collision, and yet before the occupant strikes the cushion. Furthermore, such an apparatus and method preferably provides a sufficiently wide variation in cushion stiffness to perform well under high as well as low velocity impact conditions. Yet further, such an apparatus and method is preferably inexpensive and simple to manufacture, with a minimum of modification to existing airbag module designs.

SUMMARY OF THE INVENTION

The apparatus and method of the present invention have been developed in response to the present state of the art, and in particular, in response to the problems and needs in the art that have not yet been fully solved by currently available airbag modules. Thus, it is an overall purpose of the present invention to provide an airbag module that remedies the shortcomings of the prior art. Such an airbag module may rapidly adapt the stiffness of the cushion according to one or more factors such as impact velocity, occupant weight, and occupant position.

To achieve the foregoing, and in accordance with the invention as embodied and broadly described herein in the preferred embodiment, an enhanced airbag module is provided. In one embodiment, the airbag module has a cushion designed to be stowed within a housing for rapid installation in a vehicle. An inflator is disposed at least partially within the housing to provide pressurized gas to the cushion upon receipt of an activation signal.

The cushion has an inflatable protection zone designed to cushion the impact of the occupant's body. Additionally, the cushion has a flexible venting tube that communicates with the inflatable protection zone to release inflation gas from the inflatable protection zone through an exit port. The flexible venting tube is sewn, radio frequency (RF) welded, or otherwise attached to the inflatable protection zone.

The flexible venting tube is pressed against the interior or exterior of the housing by a closure mechanism that includes a fastener. The fastener takes the form of a pyrotechnically releasable bolt with a head and a threaded shank. The shank extends through holes of the flexible venting tube and the housing, and is retained by a nut within the housing. The head compresses the flexible venting tube against the housing so that little inflation gas is able to reach the exit port through the venting tube.

The bolt has a bore with an initiator portion that captures an initiator; the initiator ignites in response to receipt of an activation signal. The bolt is designed in such a way that the head detaches from the shank when the initiator ignites. The bore also has a retaining portion through which the initiator cannot pass; the retaining portion receives an ignition plug that conveys the activation signal to the initiator. The bolt is constructed of a moldable material such as plastic. The bolt may be formed by molding the plastic around the initiator so that the initiator need not be inserted into the bore of the bolt in a separate process.

When a collision is detected, an activation signal is transmitted to the inflator to trigger inflation of the cushion. The inflator produces pressurized gas, which enters the cushion and inflates the inflatable protection zone. A microprocessor or other control device evaluates one or more factors, such as impact velocity, occupant weight, and occupant position, and determines whether active venting should be performed.

For example, if the impact occurs at high velocity or the vehicle occupant is comparatively heavy, a stiffer cushion may provide the best protection, and the closure mechanism may not be actuated. However, if the impact is a low velocity collision and/or the occupant is lighter, the closure mechanism is actuated to permit venting through the flexible venting tube, thereby reducing the stiffness of the inflatable protection zone.

More precisely, an activation signal is transmitted to the initiator of the bolt, which ignites to fracture the bolt. The head separates from the shank to permit the flexible venting tube to open and convey inflation gas out of the inflatable protection zone. The activation signal is transmitted at a time selected to permit full and rapid deployment of the inflatable protection zone prior to venting. A pre-established delay may be used to time the activation signal for the closure mechanism with respect to the activation signal for the inflator to ensure that inflation occurs before venting.

According to one alternative embodiment of the invention, an airbag module has a cushion and a flexible venting tube similar to those described above. A closure mechanism is configured somewhat differently. The closure mechanism is used to press the flexible venting tube against the exterior or interior of the housing. In addition to a pyrotechnically releasable bolt, like that described above, the closure mechanism includes a clamping member, such as a thin steel sheet, that directly compresses the flexible venting tube against the housing. The clamping member is held against the housing by the pyrotechnically releasable bolt and, for example, a conventional bolt.

After inflation occurs, if additional venting is desired, the closure mechanism is actuated by igniting an initiator within the bolt, as described above. The head of the bolt is separated from the shank, and one end of the clamping member is free to separate from the housing. The thin steel sheet bends away from the housing to permit inflation gas to flow through the flexible venting tube, and out of the flexible venting tube via the exit port. The flexible venting tube may be drawn out of the housing by the tension of the cushion, so that inflation gas vents freely into the passenger compartment of the vehicle.

According to another alternative embodiment, an airbag module again has a cushion designed to be stowed within a housing. The cushion has an inflatable protection zone and a flexible venting tube designed to permit the release of inflation gas from the inflatable protection zone. The flexible venting tube is not compressed against the housing; rather, the flexible venting tube extends through an opening in the housing to a closure mechanism coupled to a vehicle feature separated from the passenger compartment, so that the inflation gas is not vented directly into the passenger compartment.

The closure mechanism comprises a pair of clamping members, each of which is coupled to the vehicle feature. Additionally, the closure mechanism comprises a pyrotechnically releasable bolt like that described previously. The pyrotechnically releasable bolt attaches the clamping members together so that the clamping members cooperate to compress the flexible venting tube against the vehicle feature.

When the initiator within the bolt receives the activation signal, the bolt is fractured, and the clamping members are permitted to separate from each other. The flexible venting tube is thus permitted to receive inflation gas from the inflatable protection zone, and convey the inflation gas out of the cushion via the exit port. Unlike the previous embodiments, the exit port may remain in an area separate from the passenger compartment so that the flexible venting tube and the inflation gas do not encumber the passenger compartment.

Through the use of the airbag modules and associated methods of the present invention, the stiffness of airbag cushions may be rapidly adapted to suit the circumstances of the collision. Hence, vehicle occupants can receive optimal protection under a wide variety of conditions. Such benefits are obtained with a comparatively small increase in the cost and complexity of the airbag module.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
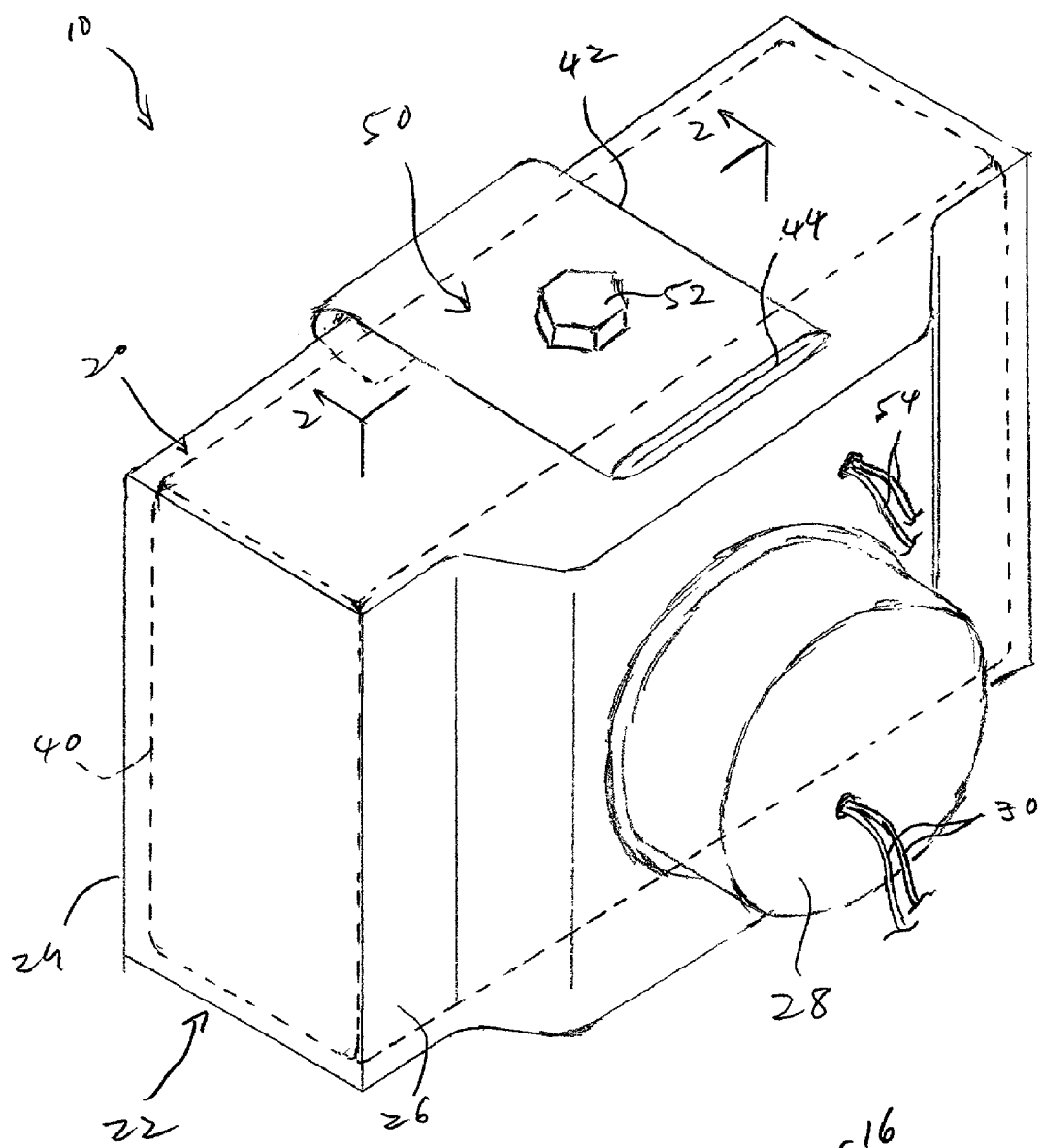
FIG. 1 is a perspective view of one embodiment of an airbag module within the scope of the invention, with the inflatable protection zone in the stowed configuration and the flexible venting tube closed to restrict venting.
Figure 1:
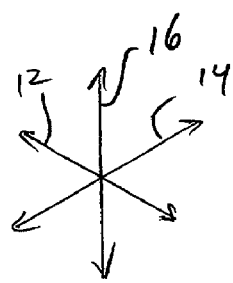

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 7, is not intended to limit the scope of the invention, as claimed, but is merely representative of presently preferred embodiments of the invention.

The present invention utilizes a number of physical principles to enhance the cost-effectiveness and operation of airbag modules. For example, principles of momentum and acceleration are used to determine the stiffness of the cushion required to protect a vehicle occupant in a given situation. The greater the momentum of a body, the greater the force required to stop its motion. Hence, a stiffer barrier is required for high speed collisions and large vehicle occupants. It is desirable to use the softest possible cushion to minimize injuries as a result of contact with the cushion.

Furthermore, gas flow regulation is used to intelligently and rapidly provide the degree of venting required to obtain the optimal stiffness. Gas flow through an opening will generally be proportional to the size of the area encompassed by the opening. An opening in a flexible member may be effectively shut, although not necessarily sealed, by compressing the flexible member near the opening.

Such principles may be applied to many types of airbags, including driver's side airbags, passenger's side airbags, overhead airbags, knee bolsters and inflatable curtains. The manner in which the present invention utilizes these principles to provide cost-effective, reliable impact protection will be shown and described in greater detail with reference to FIGS. 1 through 7.

For this application, the phrases "connected to," "coupled to," and "in communication with" refer to any form of interaction between two or more entities, including mechanical, electrical, magnetic, electromagnetic, and thermal interaction. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion.

The phrase "attached directly to" refers to a form of attachment by which the attached items are either in direct contact, or are only separated by a single fastener, adhesive, or other attachment mechanism. The term "abutting" refers to items that are in direct physical contact with each other, although the items may not be attached together.

Referring to FIG. 1, a perspective view illustrates an airbag module 10, according to one embodiment of the invention. The airbag module 10 of FIG. 1 is designed for passenger's side, frontal impact protection. However, the principles of the invention are usable with any airbag type, including driver's side front impact airbags, side impact airbags such as inflatable curtains, overhead airbags, and knee bolsters. The airbag module 10 has a longitudinal direction 12, a lateral direction 14, and a vertical direction 16, as shown.

The airbag module 10 has a cushion 20, which may be constructed of a fabric material. If desired, the cushion 20 may be coated to provide heat resistance or other desirable properties. During normal operation of the vehicle (not shown), the cushion 20 is tightly folded and stowed within a housing 22, as depicted in FIG. 1. The housing 22 is rigid, and has a shape suitable for installation in the vehicle. The housing 22 may, for example, be made of a metal. The housing 22 may have installation features designed to facilitate installation in the vehicle; such features have been omitted from FIG. 1 for clarity.

The housing 22 has a front side 24 and a rear side 26. The front side 24 faces into the passenger compartment, and is the side from which the cushion 20 will emerge. The front side 24 may be covered by a cover (not shown) that matches the interior trim of the vehicle. The rear side 26 may be attached to the vehicle and has an opening in which an inflator 28 has been installed. As depicted, the inflator 28 is generally cylindrical in shape. Activation wires 30 convey an activation signal to the inflator 28 and upon receipt of the activation signal, the inflator 28 produces pressurized gas to fill the cushion 20.

The cushion 20 has an inflatable protection zone 40, which is folded compactly to fit inside the housing 22 (the inflatable protection zone 40 is depicted with a rectangular prismoidal shape for simplicity). The inflatable protection zone 40 is the portion of the cushion 20 designed to directly receive the impact of the vehicle occupant's body.

Additionally, the cushion 20 has a flexible venting tube 42 with an exit port 44. The flexible venting tube 42 is in gaseous communication with the inflatable protection zone 40 so that the flexible venting tube 42 can receive gas from the inflatable protection zone 40. The cushion 20 may have one or more vents (not shown) aside from the flexible venting tube 42. Hence, the flexible venting tube 42 may simply provide supplemental venting, if desired.

The flexible venting tube 42 extends from the inflatable protection zone 40, and is affixed to an anchoring member by a closure mechanism 50. In the embodiment of FIG. 1, the anchoring member is the housing 22 of the airbag module 10. However, any rigid or semi-rigid member may be used as an anchoring member for the flexible venting tube 42. As shown, the flexible venting tube 42 is compressed against the top side of the housing 22 by the closure mechanism 50. A "closure mechanism," as used herein, refers to any type of mechanism capable of reversibly resisting gas flow through a flexible member such as the flexible venting tube 42.

The closure mechanism 50 has a fastener 52 used to directly attach the flexible venting tube 42 to the housing 22. The fastener 52 is "pyrotechnically releasable," or configured to unfasten in response to the ignition of a pyrotechnic. As will be shown and described in connection with FIG. 2, the pyrotechnic is embedded within the fastener 52. Activation wires 54 may extend into the housing 22 to reach the pyrotechnic (not visible in FIG. 1).

The activation wires 30 from the inflator 28 and the activation wires 54 from the closure mechanism 50 are connected to a microprocessor, microcontroller, mechanical switching system (not shown), or some other device capable of determining if and when the inflator 28 and the closure mechanism 50 should be activated. This device will be referred to as an "activation device."

The activation device may sense a collision through the use of any known sensor, such as a piezoelectric accelerometer (not shown). The activation device may utilize acceleration data, alone or in combination with other data, to determine whether the inflator 28 should be activated. The activation device may also detect other relevant metrics, such as the impact velocity, occupant weight, occupant position, and the like through the use of additional sensors (not shown). These metrics may be used to determine the desired stiffness of the inflatable protection zone 40, and to determine whether the closure mechanism 50 should be triggered to decrease the stiffness of the inflatable protection zone 40.

Figure 2:
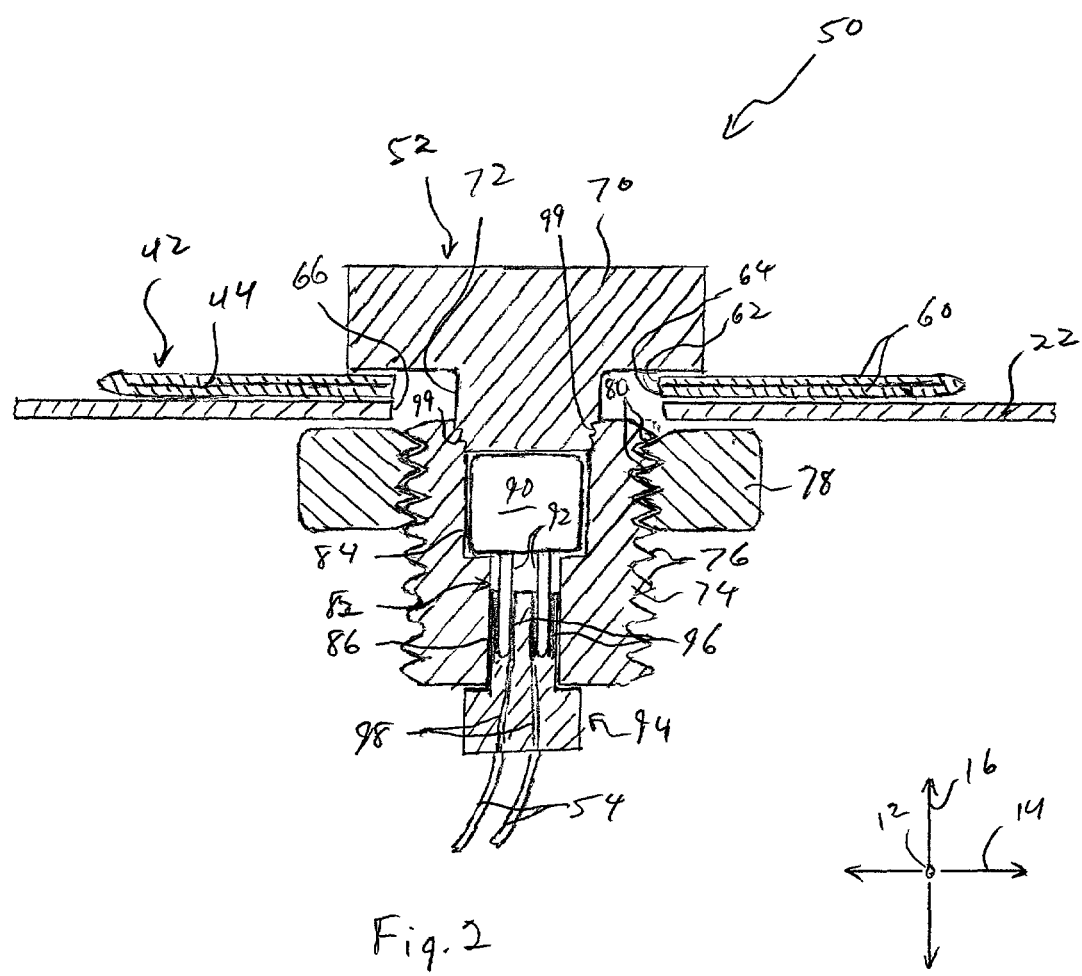
FIG. 2 is a front elevation, section view of the closure mechanism of the airbag module of FIG. 1.

Referring to FIG. 2, a front elevation, section view depicts the closure mechanism 50 in greater detail. The fastener 52 extends through a fabric wall 60 of the flexible venting tube 42. The flexible venting tube 42 may alternatively be constructed of a thin plastic, rubber, or composite material, or the like. The fabric wall 60 has a first hole 62 and a second hole 64 aligned with the first hole 62 to receive the fastener 52. Similarly, the housing 22 has a hole 66 aligned with the first and second holes 62, 64 so that the fastener 52 extends through the flexible venting tube 42 and into the interior of the housing 22. In the alternative to the first and second holes 62, 64, the flexible venting tube 42 may be folded, for example, with an accordion fold, so that the fastener 52 extends through more than two holes.

As mentioned previously, the fastener 52 is specially designed to fracture upon ignition of a pyrotechnic. The fastener 52 may be constructed of a metallic or non-metallic substance. The fastener 52 has a head 70 somewhat larger than the holes 62, 64 of the flexible venting tube 42 so that the flexible venting tube 42 cannot be pulled away from the housing 22 with the fastener 52 in place. The fastener 52 also has a neck 72 adjacent to the head 70 and a shank 74 adjacent to the neck 72. As shown, the shank 74 has a cross sectional area (perpendicular to the axis of rotation of the fastener 52) smaller than the cross sectional area of the head 70. Similarly, the neck 72 has a cross sectional area smaller than that of the shank 74.

The shank 74 has threads 76, so that the fastener 52 can act as a bolt. A nut 78 has corresponding interior threads 80 that engage the threads 76 of the shank 74. The nut 78 is disposed in the interior of the housing 22 to keep the head 70 relatively tight against the flexible venting tube 42. The head 70 may be tightened to a pre-established load with respect to the nut 78 to ensure that the flexible venting tube 42 is properly compressed.

The fastener 52 has a bore 82 disposed along the rotational axis of the fastener 52. The bore 82, as shown, has an initiator portion 84 toward the head 70 and a retaining portion 86 further from the head 70. The retaining portion 86 terminates at the end of the shank 74. The initiator portion 84 contains an initiator 90, or "squib," which is a compact pyrotechnic device configured to fracture, and possibly to produce pressurized gas and heat, in response to receipt of the activation signal. The initiator 90 may be of a type similar to that used to activate the inflator 28, or may be specially designed for use in the fastener 52.

The initiator portion 84 has a larger cross sectional area than the retaining portion 86. Hence, the initiator 90 is unable to pass through the retaining portion 86 so that the initiator portion 84 effectively captures the initiator 90. The initiator 90 has a pair of prongs 92 designed to receive the activation signal and conduct it into the body of the initiator 90. The prongs 92 extend into the retaining portion 86. A plug 94 is inserted into the retaining portion 86 from the interior of the housing 22. The plug 94 has receptacles 96 sized to receive the prongs 92 and conductors 98 that conduct the activation signal from the activation wires 54 to the receptacles 96.

When the initiator 90 ignites, pressurized gas and heat are produced. Since the initiator 90 is unable to leave the initiator portion 84 of the bore 82, the pressure from ignition is directed generally toward the head 70. The generally circular end of the initiator portion 84 of the bore 82 may have a somewhat sharp juncture; similarly, the juncture of the neck 72 with the shank 74 may be sharp. Such sharp junctures form stress concentrations; as a result, the fastener 52 will tend to fracture along fracture lines 99 that run generally from the end of the initiator portion 84 to the juncture of the neck 72 and shank 74, as shown.

The result is that the head 70 and neck 72 are separated from the shank 74, and the items that were fastened by the fastener 52 are "unfastened," or permitted to separate from each other. In the context of the closure mechanism 50, ignition of the initiator 90 removes the head 70 from the shank 74, thereby permitting the flexible venting tube 42 to leave the housing 22 to permit venting. This will be further described in connection with FIG. 4.

The fastener 52 may be manufactured with the initiator 90 in place, thereby eliminating the step of inserting the initiator 90 into the bore 82. More precisely, the initiator 90 may be inserted into a mold (not shown) prior to entry of plastic. The initiator 90 may be held in place within the mold while flowable plastic is injected or otherwise inserted into the mold. The plastic generally surrounds the initiator 90 so that, when the plastic solidifies, an integrally formed casing is created. The integrally formed casing includes the head 70, the neck 72, and the shank 74. The initiator portion 84 of the bore 82 forms around the initiator 90, and thus effectively captures the initiator 90.

The retaining portion 86 of the bore 82 may be created by inserting a tubular spacer (not shown) around the prongs 92 and pressing the tubular spacer into abutment with the body of the initiator 90 prior to placement of the initiator 90 within the mold. The tubular spacer may then extend to the wall of the mold so that the retaining portion 86 of the bore 82 will remain vacant when plastic enters the mold.

In the alternative, the retaining portion 86 of the bore 82 need not be provided. Rather, the prongs 92 may be lengthened to extend past the end of the shank 74, and the plastic may be permitted to fill the region around the prongs 92, adjacent to the body of the initiator 90. The prongs 92 would then extend from the solid end of the shank 74, and the plug 94 may abut the end of the shank 74 to engage the prongs 92.

In the alternative to the fastener 52, any rapid actuating mechanism may be used to actuate the closure mechanism 50. Solenoids, rotary and linear motors, piezoelectric devices, and the like may all be used to provide actuation of the closure mechanism.

Figure 3:
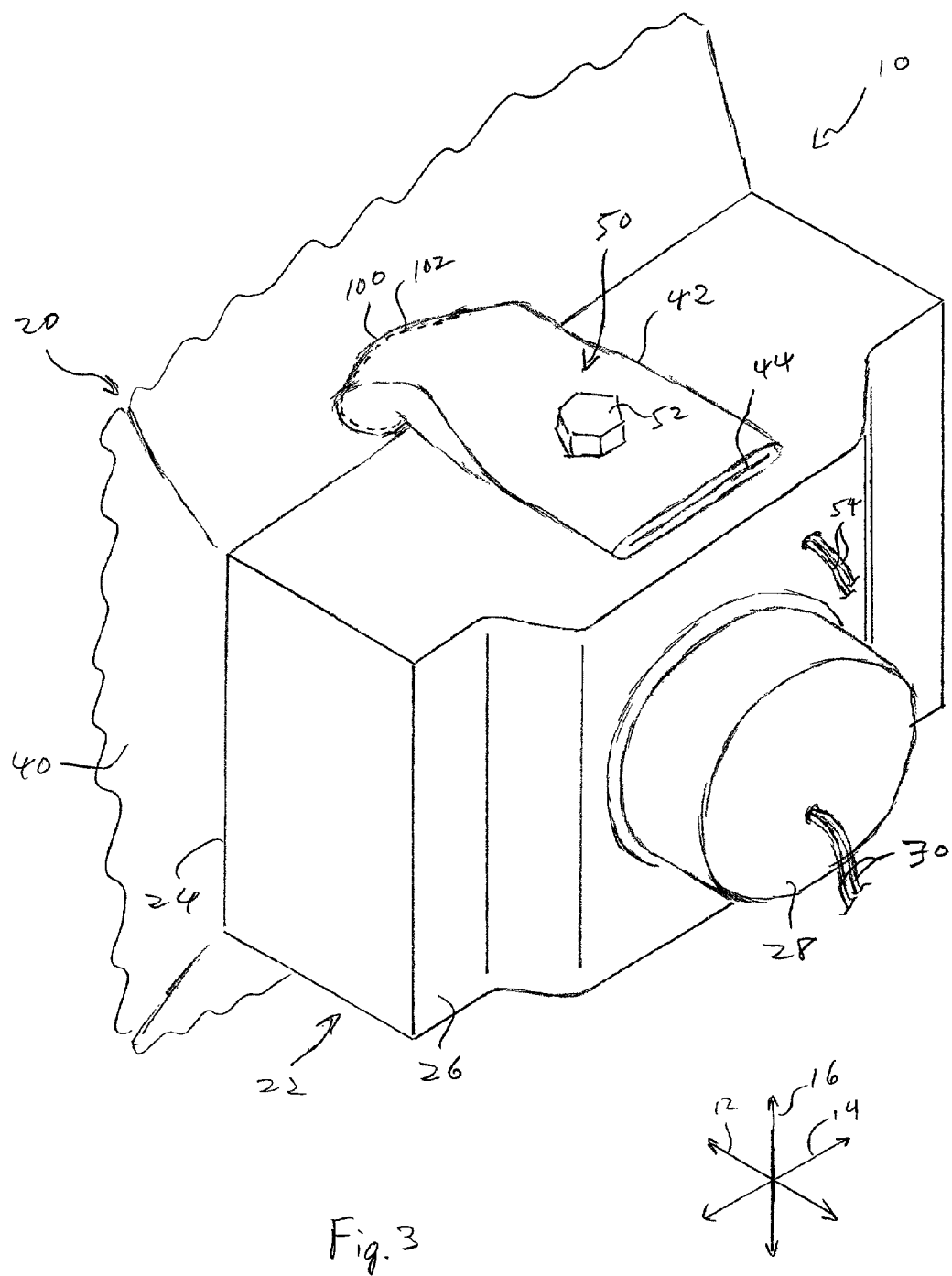
FIG. 3 is a perspective view of the airbag module of FIG. 1, with the inflatable protection zone in the deployed configuration and the flexible venting tube closed.

Referring to FIG. 3, a perspective view shows the airbag module 10 of FIG. 1, after inflation of the inflatable protection zone 40, but prior to actuation of the closure mechanism 50. The activation device has transmitted an activation signal along the activation wires 30, and the inflator 28 has deployed in response to fill the inflatable protection zone 40 with gas. The inflatable protection zone 40 has left the housing 22 to position itself between the vehicle occupant and adjacent parts of the vehicle.

In this application, "actuation" of the closure mechanism 50 refers to motion of the closure mechanism 50 to permit increased inflation gas flow through the flexible venting tube 42. The closure mechanism 50 may have a closed configuration, in which it flattens a portion of the flexible venting tube 42 to restrict, or even substantially prevent, inflation gas from flowing through the flexible venting tube 42.

Furthermore, the closure mechanism 50 may have an open configuration, in which it at least partially releases the flexible venting tube 42 to permit venting of inflation gas from the inflatable protection zone 40 via the flexible venting tube 42. Actuation of the closure mechanism 50 may entail movement of the closure mechanism 50 from the closed configuration to the open configuration.

As shown in FIG. 3, the flexible venting tube 42 has an inlet port 100 in communication with the inflatable protection zone 40. The material surrounding the inlet port 100 is attached to the material of the inflatable protection zone 40 by a sewn seam 102, as depicted. In the alternative, any other attachment method, such as one-piece weaving, radio frequency (RF) welding, ultrasonic welding, chemical bonding, or adhesive bonding, may be used to attach the flexible venting tube 42 to the inflatable protection zone 40. It may be desirable to make the flexible venting tube 42 long enough to provide some slack in the flexible venting tube 42 when the inflatable protection zone 40 deploys, to ensure that the tension on the material of the inflatable protection zone 40 does not place excessive stress on the flexible venting tube 42.

It is beneficial to avoid actuating the closure mechanism 50 until after the inflatable protection zone 40 has deployed because venting through the flexible venting tube 42 could otherwise slow the deployment of the inflatable protection zone 40. In order to ensure that the inflatable protection zone 40 fully inflates in time to cushion the body of the vehicle occupant, the activation signal for the closure mechanism 50 may be delayed by a pre-established time period after the activation signal has been transmitted to the inflator 28.

This pre-established time period may range from about 10 milliseconds to about 100 milliseconds. Furthermore, the pre-established time period may range from about 25 milliseconds to about 75 milliseconds. Yet further, the pre-established time period may range from about 40 milliseconds to about 50 milliseconds. For out-of-position conditions (i.e., the vehicle occupant is out of alignment with the inflatable protection zone 40), it may be beneficial for this time period to be 0 milliseconds, so that activation of the inflator 28 and the closure mechanism 50 are substantially simultaneous.

In the alternative, the delay may also be varied in response to various factors. For example, a longer delay may make the inflatable protection zone 40 comparatively stiff when struck by a vehicle occupant, even though venting is used. Similarly, a shorter delay may soften the inflatable protection zone 40. Thus, the inflatable protection zone 40 need not be limited to two distinct, "stiff" or "soft" configurations.

Figure 4:
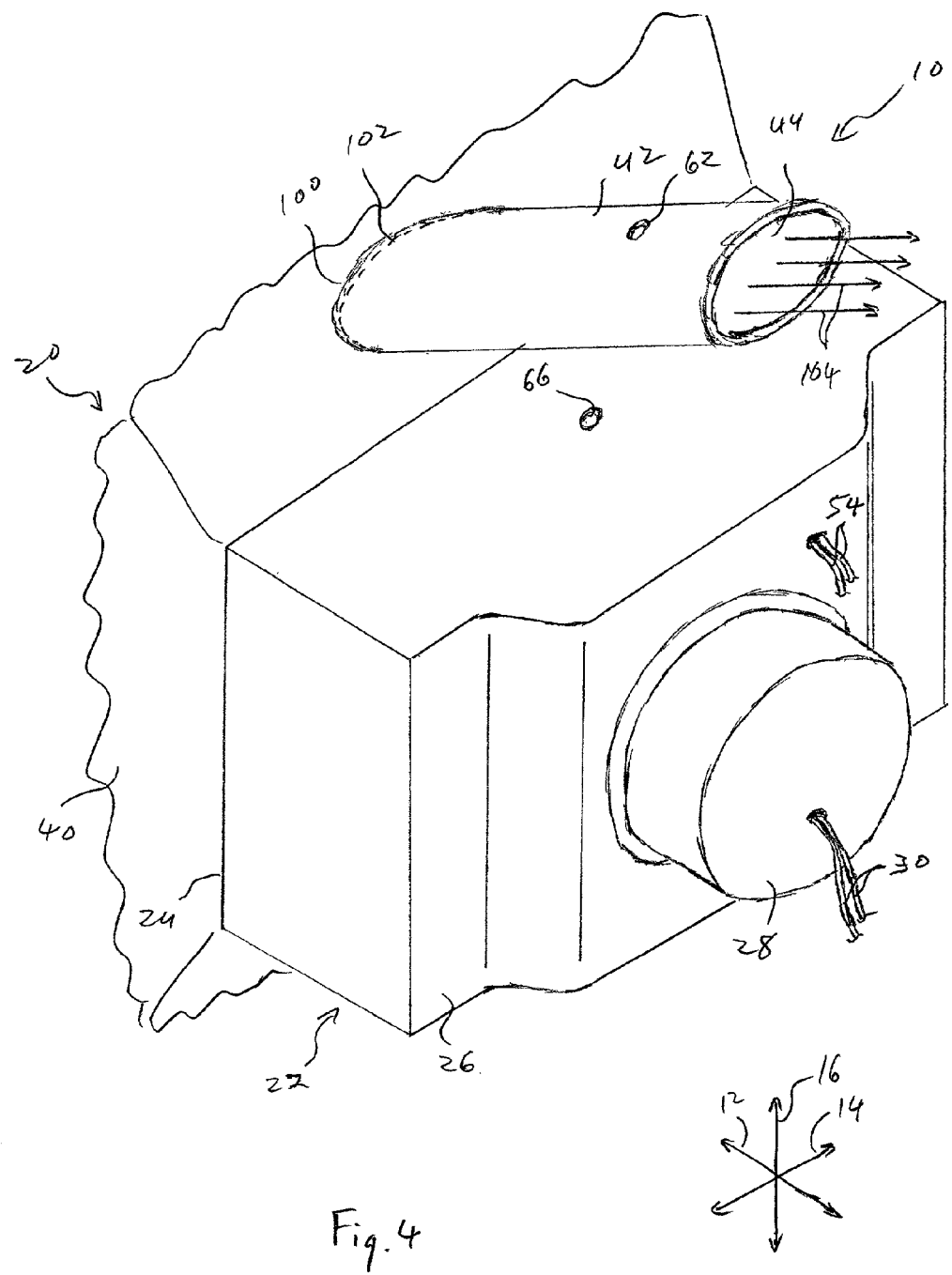
FIG. 4 is a perspective view of the airbag module of FIG. 1, with the inflatable protection zone in the deployed configuration and the flexible venting tube open to permit venting of inflation gas from the inflatable protection zone.

Referring to FIG. 4, a perspective view shows the airbag module 10 after inflation of the inflatable protection zone 40 and actuation of the closure mechanism 50. The initiator 90 (not visible in FIG. 4) has ignited in response to the activation signal, thereby fracturing the fastener 52 to separate the head 70 from the shank 74. Thus, the flexible venting tube 42 is free to move away from the housing 22 and to convey inflation gas from the inflatable protection zone 40. Gas outflows from the exit port 44 of the flexible venting tube 42 are shown by the arrows 104.

Figure 5:
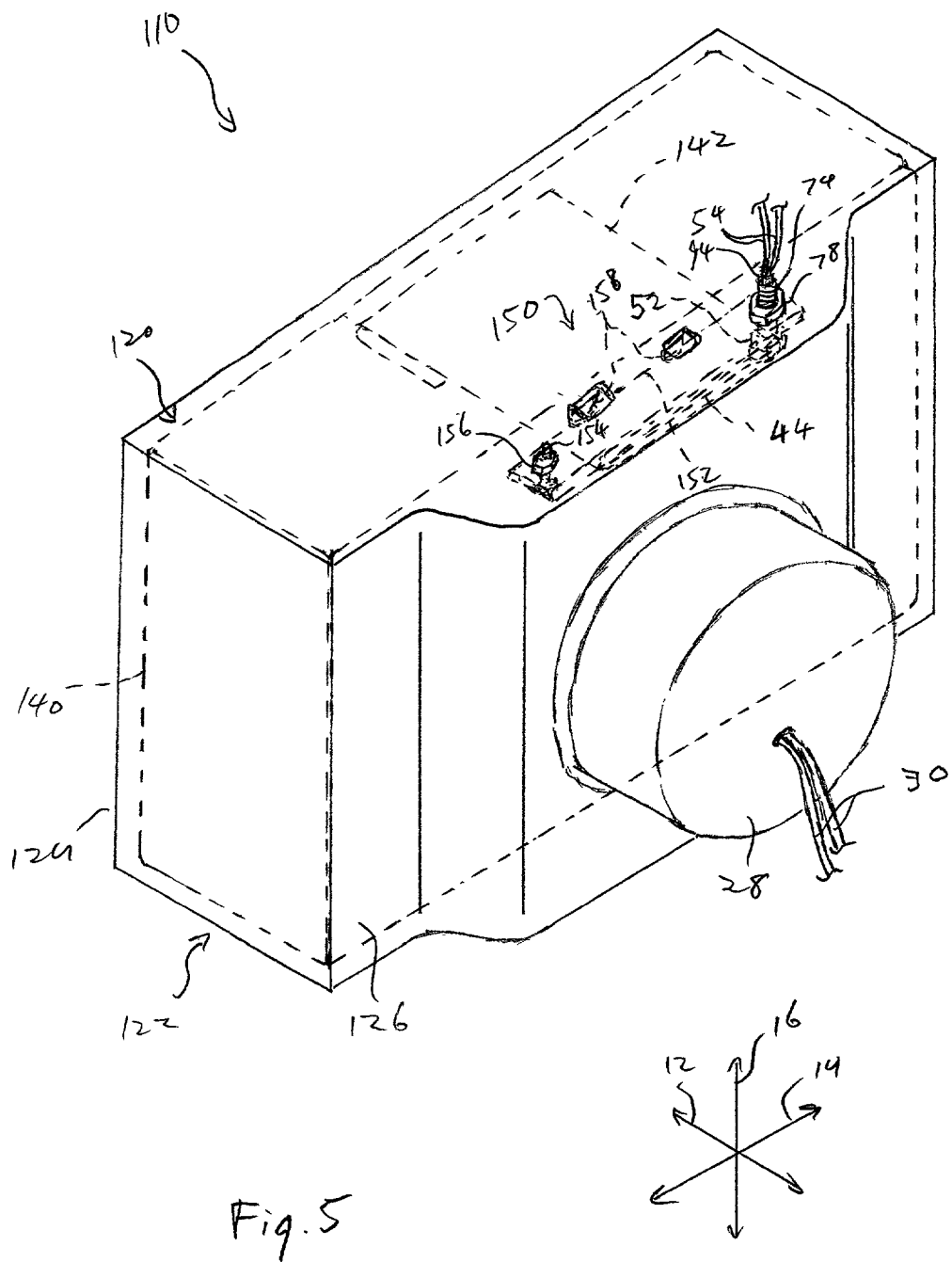
FIG. 5 is a perspective view of an airbag module within the scope of the invention, according to one alternative embodiment.
Figure 6:
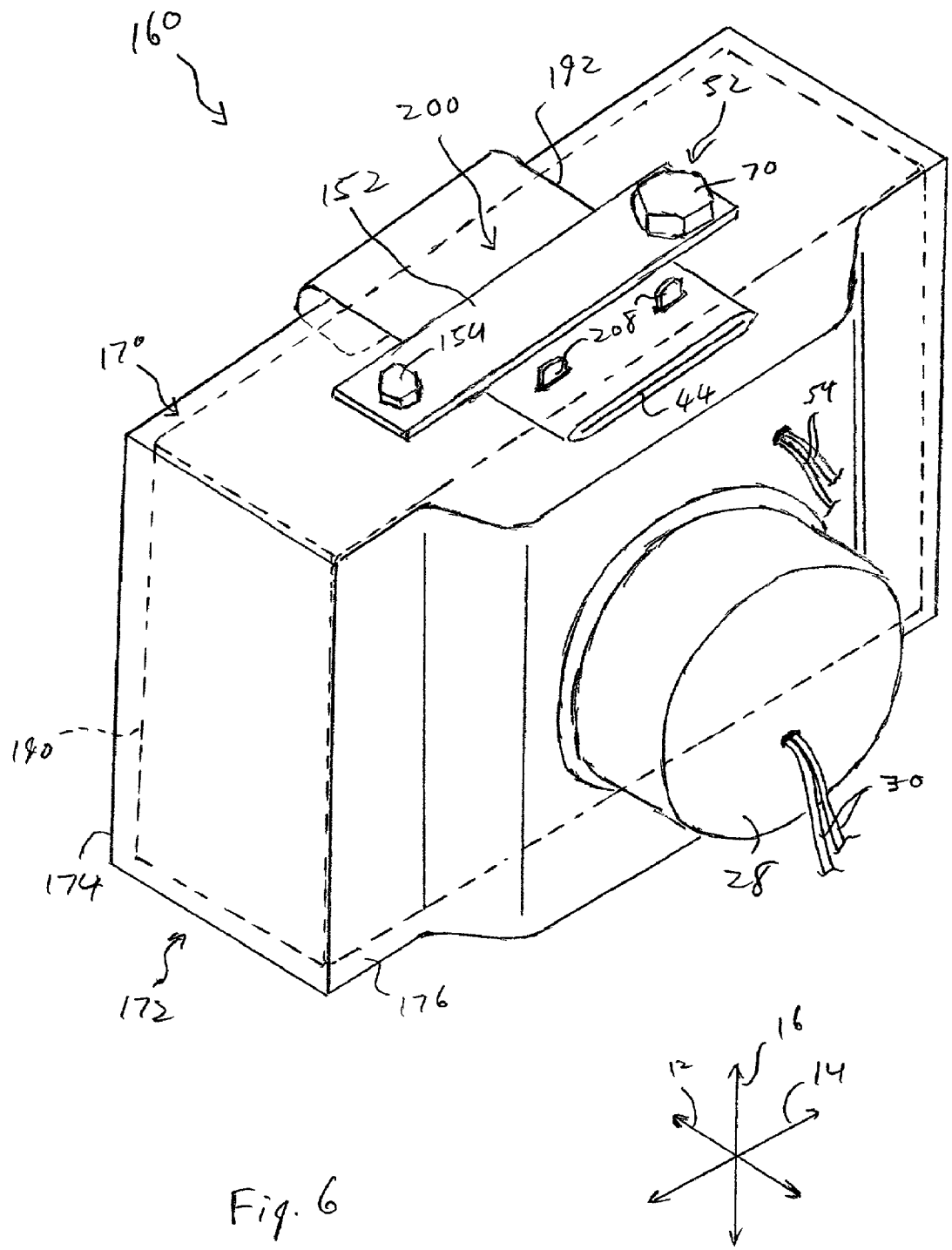
FIG. 6 is a perspective view of an airbag module within the scope of the invention, according to another alternative embodiment.
Figure 7:
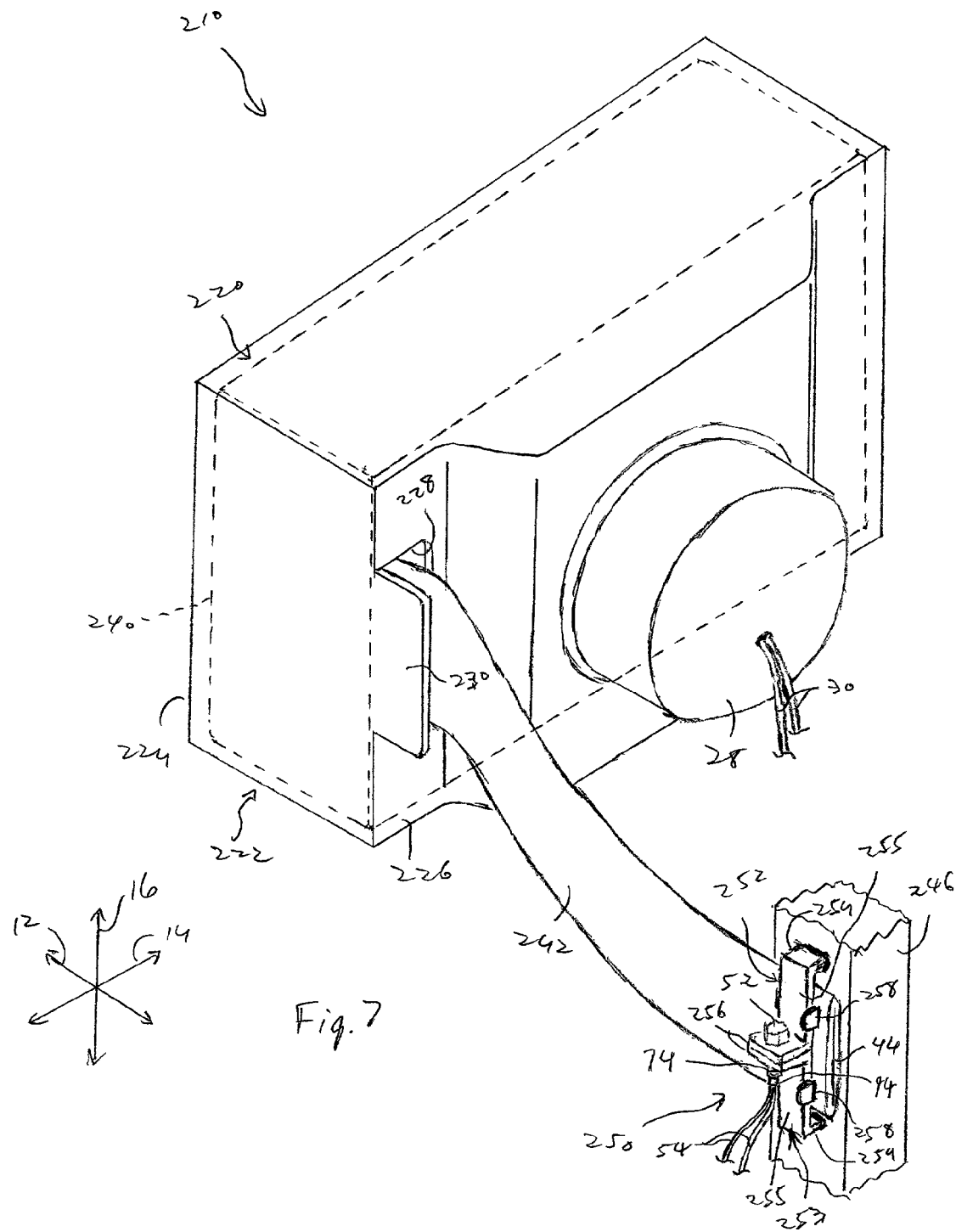
FIG. 7 is a perspective view of an airbag module within the scope of the invention, according to yet another alternative embodiment.

Numerous alternative closure mechanism and flexible venting tube configurations may be used. Only a few such alternatives are described herein. If desired, one or more clamping members may be used to more uniformly block gas flow through the flexible venting tube. FIGS. 5, 6, and 7 depict the use of such clamping members.

Referring to FIG. 5, a perspective view depicts an airbag module 110 according to one alternative embodiment of the invention. As with the previous embodiment, the airbag module 110 has a cushion 120, which may be compacted and disposed within a housing 122 during normal operation of the vehicle. The housing 122 has a front side 124 and a rear side 126. The cushion 120 has an inflatable protection zone 140 and a flexible venting tube 142.

In contrast to the embodiment of FIGS. 1 through 4, the flexible venting tube 142 of FIG. 5 is disposed entirely within the housing 122 when the inflatable protection zone 140 is in its stowed configuration. Gas flow through the flexible venting tube 142 may be restricted through the use of a closure mechanism 150 disposed mostly within the housing 122. The housing 122 serves as an anchoring member for the closure mechanism 150.

As shown, a pyrotechnically releasable fastener 52, which may be identical to that of the previous embodiment, is incorporated in the closure mechanism 150 of FIG. 5. Additionally, a clamping member 152 is used to compress the flexible venting tube 142 against the interior of the housing 122. The clamping member 152 may take the form of a thin metal sheet, such as a piece of spring steel.

The clamping member 152 is attached to the interior of the housing 122 by the fastener 52 on one end, and by a conventional bolt 154 on the opposite end. The heads of the fastener 52 and the conventional bolt 154 are disposed within the housing 122, while the threaded portions extend outward through the wall of the housing 122. The nut 78 retains the shank 74, and is disposed outside the housing 122. Similarly, a nut 156 retains the threaded portion of the conventional bolt 154 and is disposed outside the housing 122. As in the previous embodiment, the plug 94 engages the shank 74, and the activation wires 54 extend from the plug 94.

The housing 122 may have a plurality of tabs 158 that extend inward, through slots in the flexible venting tube 142. The tabs 158 serve to keep the flexible venting tube 142 from being drawn out of the closure mechanism 150 prematurely, i.e., prior to actuation of the closure mechanism 150. The tabs 158 may simply be formed by cutting a three-sided rectangle in the housing 122 and bending the fourth side approximately ninety degrees so that the tabs 158 extend inward. As shown, the tabs 158 are positioned forward of the closure mechanism 150; however, if desired, the tabs 158 may instead be positioned rearward of the closure mechanism 150, so that the tabs 158 are positioned between the closure mechanism 150 and the exit port 44.

The flexible venting tube 142 is thus sandwiched between the clamping member 152 and the interior surface of the housing 122. As in the previous embodiment, the inflatable protection zone 140 inflates prior to actuation of the closure mechanism 150. If the activation device determines that increased venting is needed, an activation signal is transmitted to the initiator 90 within the fastener 52 via the activation wires 54.

The head 70 of the fastener 52 then separates from the shank 74 to release one end of the clamping member 152. The inflation gas pressure within the flexible venting tube 142 causes the flexible venting tube 142 to expand between the clamping member 152 and the housing 122, thereby bending the comparatively thin clamping member 152. Expansion of the flexible venting tube 142 away from the housing may cause withdrawal of the tabs from the flexible venting tube 142. The flexible venting tube 142 may then be drawn out of the housing 122 to vent the inflation gas into the passenger compartment of the vehicle, as with the previous embodiment.

Referring to FIG. 6, a perspective view shows an airbag module 160 according to another alternative embodiment of the invention. As in previous embodiments, the airbag module 160 has a cushion 170 designed to be compacted and stowed within a housing 172. The housing has a front side 174 facing toward the vehicle occupant and a rear side 176 facing into the vehicle. The cushion 170 has an inflatable protection zone 190 and a flexible venting tube 192 in gaseous communication with the inflatable protection zone 190.

As with previous configurations, the housing 172 of the airbag module 160 is designed to serve as an anchoring member for the flexible venting tube 192. More specifically, the airbag module 160 has a closure mechanism 200 similar to the closure mechanism 150 of the airbag module 110 of FIG. 5, except that the closure mechanism 200 is disposed on the exterior surface of the housing 172, not the interior surface.

Hence, like the closure mechanism 150, the closure mechanism 200 comprises a clamping member 152, a pyrotechnically releasable fastener 52 with a corresponding nut 78 (not visible in FIG. 6), and a conventional bolt 154 with a corresponding conventional nut 156 (also not visible in FIG. 6). The fastener 52 and the conventional bolt 154 are used to attach the clamping member 152 to the exterior surface of the housing 172 such that the flexible venting tube 192 is sandwiched and flattened between the clamping member 152 and the housing 172. The activation wires 54 from the fastener 52 extend from the plug 94 (not visible) through the housing 172.

Tabs 208 extend upward from the housing 172 to engage slots of the flexible venting tube 192. Like the slots 158 of the previous embodiment, the slots 208 serve to prevent the flexible venting tube 192 from being prematurely drawn out of the closure mechanism 200.

Upon transmission of an activation signal through the activation wires 54, the fastener 52 fractures, and the head 70 is separated from the remainder of the fastener 52. One side of the clamping member 152 is then free to move away from the housing 172, and the inflation gas pressure within the flexible venting tube 192 will tend to bend the clamping member 152 outward. As the flexible venting tube 192 assumes a more rounded shape, the flexible venting tube 192 may be drawn out of engagement with the tabs 208, so that the flexible venting tube 192 is able to be pulled out of the closure mechanism 200 and into the passenger compartment. Inflation gas may then move from the cushion 170 to the passenger compartment via the exit port 44.

In FIG. 6, the end of the flexible venting tube 192 proximate the exit port 44 is shown releasably attached to the top of the housing 172. However, the end of the flexible venting tube 192 may be attached to any portion of the housing 172, or to any other part of the airbag module 160. In fact, the end of the flexible venting tube 192 need not be attached to an airbag module; a closure mechanism may be positioned to receive the end of the flexible venting tube 192 in a wide variety of locations within the vehicle. This concept will be further illustrated and described below.

It may be desirable to vent the inflation gas into a different location of the vehicle to reduce any risk of injury due to direct exposure to the inflation gas. The use of a flexible venting tube provides a mechanism whereby the destination of the inflation gas can be readily controlled. For example, the flexible venting tube may be attached to an anchoring member that takes the form of a vehicle feature separated from the passenger compartment. Such a configuration will be shown and described in connection with FIG. 7.

Referring to FIG. 7, a perspective view shows an airbag module 210 according to yet another alternative embodiment of the invention. As with the previous embodiments, the airbag module 210 has a cushion 220 designed to be compacted and stowed within a housing 222. The housing 222 has a front side 224 and a rear side 226. An inflator 28 is installed in the rear side 226, to be triggered by an activation signal transmitted via activation wires 30. The rear side 226 also has an opening 228 created by cutting along three sides of a rectangle, and folding the fourth side at approximately ninety degrees. The result is a tab 230 that protrudes outward from the rear side 226.

The cushion 220 includes an inflatable protection zone 240 and a flexible venting tube 242. Rather than attaching to the housing 222, the flexible venting tube 242 exits the housing 222 via the opening 228 in the rear side 226 to reach a vehicle feature 246, which acts as the anchoring member for the flexible venting tube 242.

In this application, a "vehicle feature" is broadly defined to include any part of the airbag module 210 or vehicle, including the vehicle frame, trim, instrument panel, body, or any other feature of the vehicle. The flexible venting tube 242 is attached to the vehicle feature 246 via a closure mechanism 250. As with previous embodiments, the closure mechanism 250 can be pyrotechnically actuated to permit increased inflation gas flow through the flexible venting tube 242.

The closure mechanism 250 comprises a first clamping member 252 and a second clamping member 253. Each of the clamping members 252, 253 has an anchoring portion 254, a central portion 255, and a fastening portion 256. As shown, the central portion 255 may be elongated, and the anchoring portion 254 and the fastening portion 256 may extend at generally perpendicular angles from opposite sides of the central portion 255.

Each of anchoring portions 254 is coupled to the vehicle feature 246. Preferably, the clamping members 252, 253 are somewhat flexible, or the anchoring portions 254 are coupled to the vehicle feature 246 in a manner that permits pivotal motion of the clamping members 252, 253 with respect to the vehicle feature 246. According to one example, the vehicle feature 246 has slots designed to receive the anchoring portions 254. Each of the anchoring portion 254 may then have a perpendicular segment (not shown) disposed within a hollow interior of the vehicle feature to ensure that the anchoring portions 254 are not withdrawn from the slots, while still permitting pivotal motion.

When the anchoring portions 254 have been coupled to the vehicle feature 246, the fastening portions 256 may be attached together through the use of a pyrotechnically releasable fastener 52, like those of the embodiments described previously. When the fastening portions 256 are attached together, the central portions 255 of the first and second clamping members 252, 253 both extend generally parallel to the vehicle feature 246, so that the flexible venting tube 242 is sandwiched between the central portions 255 and the vehicle feature 246.

The vehicle feature 246 may have a plurality of tabs 258 that extend into corresponding slots of the flexible venting tube 242. Like the tabs 158 of the previous embodiment, the tabs 258 are designed to ensure that the flexible venting tube 242 is not prematurely withdrawn from the closure mechanism 250.

Since the flexible venting tube 242 need not be withdrawn through the housing 222 and into the passenger compartment, it may even be desirable to configure the tabs 258 to retain the flexible venting tube 242 after actuation of the closure mechanism 250. The tabs 258 may, for example, be bent sideways to prevent withdrawal of the tabs 258 from the slots of the flexible venting tube 242. In any case, the exit port 44 of the flexible venting tube 242 remains within the area rearward of the housing 222, rather than being drawn into the passenger compartment.

After the inflatable protection zone 240 has inflated, if the activation device determines that venting is needed, an activation signal is transmitted to the initiator 90 within the fastener 52 to remove the head 70 of the fastener 52 from the shank 74. This permits the fastening portions 256 of the clamping members 252, 253 to separate from each other. The clamping members 252, 253 then bend or rotate in response to inflation gas pressure within the flexible venting tube 242 to permit increased gas flow through the flexible venting tube 242.

Unlike the previously described embodiments, inflation gas exiting the flexible venting tube 242 via the exit port 44 is expelled into an area separated from the passenger compartment, such as the instrument panel or hood area. Thus, vehicle occupants are not directly exposed to heat, particulate matter, or pressure increases that may otherwise accompany vented inflation gas. The vehicle occupants obtain the benefits of active venting, without the potential disadvantages of direct contact with vented inflation gas.

In other alternative embodiments of the invention, no anchoring member need be provided. Rather, inflation gas flow through a flexible venting tube, such as the flexible venting tube 242 of FIG. 7, may be releasably resisted through the use of a closure mechanism that is not anchored to any part of the airbag module or vehicle. Such a freely movable closure mechanism may simplify the process of installing the airbag module in the vehicle because the closure mechanism could be installed prior to installation of the airbag module in the vehicle without affixing the flexible venting tube directly to the module.

The airbag modules and associated methods of the present invention present significant improvements in airbag design. More specifically, the stiffness of the cushion can be rapidly altered to suit the circumstances of the collision so that effective protection can be provided for a wide range of situations. Such enhanced protection is provided with little additional cost and complexity.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. An airbag module for providing impact protection for a vehicle occupant, the airbag module comprising:
   an inflatable protection zone;
   a flexible venting tube in gaseous communication with the inflatable protection zone, the flexible venting tube having an exit port configured to permit gas to escape from the inflatable protection zone via the flexible venting tube; and
   a closure mechanism configured to restrict gas flow through the exit port and to decrease restriction of gas flow through the exit port in response to receipt of an activation signal.

2. The airbag module of claim 1, wherein the inflatable protection zone is incorporated in an airbag module selected from the group consisting of a driver's side front impact airbag module and a passenger's side front impact airbag module.

3. The airbag module of claim 1, wherein the inflatable protection zone is incorporated in an airbag module selected from the group consisting of a side impact airbag module, a knee bolster module, and an overhead airbag module.

4. The airbag module of claim 1, wherein the flexible venting tube is attached directly to the inflatable protection zone.

5. The airbag module of claim 4, wherein the flexible venting tube is sewn to the inflatable protection zone.

6. The airbag module of claim 4, wherein the flexible venting tube is radio frequency welded to the inflatable protection zone.

7. The airbag module of claim 1, wherein the closure mechanism comprises a closed configuration, in which the closure mechanism grips the flexible venting tube to keep the flexible venting tube substantially flat to restrict gas flow through the exit port, and an open configuration, in which the closure mechanism at least partially releases the flexible venting tube to permit increased gas flow through the exit port.

8. The airbag module of claim 7, wherein the closure mechanism is configured to be actuated from the closed configuration to the open configuration in response to ignition of a pyrotechnic by the activation signal.

9. The airbag module of claim 8, wherein the closure mechanism comprises a bolt having a head and a shank, wherein the head separates from the shank in response to ignition of the pyrotechnic.

10. The airbag module of claim 9, wherein the bolt comprises an integrally formed casing that includes the head and the shank, the integrally formed casing having a bore with an initiator portion containing an initiator that further contains the pyrotechnic, wherein the initiator portion is shaped to keep the initiator within the bore.

11. An airbag module comprising:
   an airbag having an inflatable protection zone and a closure mechanism comprising a flexible venting tube in gaseous communication with the inflatable protection zone for controlling venting from the airbag;
   an anchoring member; and
   a fastener coupled to the anchoring member to compress the flexible venting tube, thereby restricting gas flow through an exit port of the flexible venting tube, wherein the fastener is configured to unfasten in response to receipt of an activation signal to decrease restriction of gas flow through the exit port.

12. The airbag module of claim 11, wherein the fastener is configured to unfasten in response to ignition of a pyrotechnic, wherein unfastening of the fastener permits the closure mechanism to move from a closed configuration, in which the closure mechanism grips the flexible venting tube to keep the flexible venting tube substantially flat to restrict gas flow through the exit port, to an open configuration, in which the closure mechanism at least partially releases the flexible venting tube to permit increased gas flow through the exit port.

13. The airbag module of claim 12, wherein the fastener comprises a bolt having a head and a shank, wherein the head separates from the shank in response to ignition of the pyrotechnic.

14. The airbag module of claim 13, wherein the bolt comprises an integrally formed casing having a bore with an initiator portion containing an initiator that further contains the pyrotechnic, wherein the initiator portion is shaped to keep the initiator within the bore.

15. The airbag module of claim 12, wherein the fastener extends through at least one hole of the flexible venting tube and seats directly in the anchoring member to press the flexible venting tube against the anchoring member in the closed configuration.

16. The airbag module of claim 12, further comprising a clamping member attached to the anchoring member by the fastener to clamp the flexible venting tube against the anchoring member in the closed configuration.

17. The airbag module of claim 12, wherein the anchoring member comprises an airbag module housing configured to contain a compacted inflatable protection zone.

18. The airbag module of claim 12, wherein the anchoring member comprises a vehicle feature separated from a passenger compartment of a vehicle so that inflation gas emerging from the exit port is not vented directly into the passenger compartment.

19. A method for providing impact protection for an occupant of a vehicle with an airbag module comprising a cushion having an inflatable protection zone in gaseous communication with a flexible venting tube, the flexible venting tube having an exit port configured to permit gas to escape from the inflatable protection zone via the flexible venting tube, the airbag module further comprising a closure mechanism for controlling gas flow through the flexible venting tube, the method comprising:
   inflating the cushion; and
   actuating the closure mechanism to reduce restriction of gas flow through the exit port of the flexible venting tube to permit gas to escape from the inflatable protection zone of the cushion via the flexible venting tube, wherein actuating the closure mechanism comprises moving the closure mechanism from a closed configuration, in which the closure mechanism grips the flexible venting tube to keep the flexible venting tube substantially flat to restrict gas flow through the exit port, to an open configuration, in which the closure mechanism at least partially releases the flexible venting tube to permit increased gas flow through the exit port wherein actuating the closure mechanism further comprises transmitting an activation signal to the closure mechanism to ignite a pyrotechnic.

20. The method of claim 19, wherein the cushion is incorporated in an airbag module selected from the group consisting of a driver's side front impact airbag module and a passenger's side front impact airbag module, wherein inflating the cushion comprises positioning the cushion to provide front impact protection.

21. The method of claim 19, wherein the cushion is incorporated in an airbag module selected from the group consisting of a side impact airbag module, a knee bolster module, and an overhead airbag module, wherein inflating the cushion comprises positioning the cushion to provide a type of protection selected from the group consisting of side impact protection, knee protection, and overhead protection.

22. The method of claim 19, wherein the closure mechanism comprises a bolt having a head and a shank, wherein actuating the closure mechanism further comprises separating the head from the shank in response to ignition of the pyrotechnic.

23. The method of claim 19, wherein the closure mechanism is actuated after the cushion has substantially inflated to facilitate rapid inflation of the cushion.

24. The method of claim 23, wherein actuation of the closure mechanism is triggered by an activation signal transmitted when a pre-established time has elapsed since transmission of an activation signal that triggers inflation of the cushion, wherein the pre-established time ranges from about 40 milliseconds to about 50 milliseconds.

25. The method of claim 19, wherein, when the vehicle occupant is determined to be out-of-position, actuation of the closure mechanism is triggered by an activation signal transmitted substantially simultaneously with transmission of an activation signal that triggers inflation of the cushion.

26. A method for actuating a closure mechanism to control venting from an inflatable protection zone of an airbag module via a flexible venting tube in gaseous communication with the inflatable protection zone, the closure mechanism comprising a fastener, the method comprising:
   transmitting an activation signal to ignite a pyrotechnic; and
   unfastening the fastener in response to ignition of the pyrotechnic to decrease restriction of gas flow through an exit port of the flexible venting tube.

27. The method of claim 26, wherein decreasing restriction of gas flow through the exit port comprises moving the closure mechanism from a closed configuration, in which the closure mechanism grips the flexible venting tube to keep the flexible venting tube substantially flat to restrict gas flow through the exit port, to an open configuration, in which the closure mechanism at least partially releases the flexible venting tube to permit increased gas flow through the exit port.

28. The method of claim 27, wherein the fastener comprises a bolt having a head and a shank, wherein unfastening the fastener comprises separating the head from the shank.

29. The method of claim 28, wherein the head directly compresses the flexible venting tube against an anchoring member in the closed configuration, wherein decreasing restriction of gas flow through the exit port comprises removing the head from the flexible venting tube.

30. The method of claim 28, wherein the closure mechanism comprises a clamping member attached to an anchoring member by the bolt to compress the flexible venting tube between the clamping member and the anchoring member in the closed configuration, wherein decreasing restriction of gas flow through the exit port comprises removing the head from the clamping member to permit at least partial separation of the clamping member from the anchoring member.

31. The method of claim 28, wherein the closure mechanism comprises first and second clamping members coupled to an anchoring member and attached together by the bolt to compress the flexible venting tube between the clamping members and the anchoring member, wherein decreasing restriction of gas flow through the exit port comprises removing the head from the clamping members to permit separation of the clamping members from each other, thereby permitting at least partial separation of the clamping members from the anchoring member.

32. An airbag module comprising:
   an airbag having an inflatable protection zone;
   a flexible venting tube in gaseous communication with the inflatable protection zone for controlling venting from the airbag;

a first clamping member; and a second clamping member attached to the first clamping member by a fastener so that the first and second clamping members clamp the flexible venting tube in a closed configuration, wherein the fastener is configured to unfasten in response to receipt of an activation signal to permit increased gas flow through the flexible venting tube.

* * * * *